US011014142B2

(12) United States Patent
Varrelmann (10) Patent No.: US 11,014,142 B2
(45) Date of Patent: May 25, 2021

(54) PROCESSING SYSTEM FOR AIRCRAFT STRUCTURAL COMPONENTS (71) Applicant: Broetje-Automation GmbH, Rastede (DE)

(72) Inventor: Nils Varrelmann, Varel (DE)

(73) Assignee: Broetje-Automation GmbH, Rastede (DE)

( * ) Notice: Subject to any disclaimer, the term of this patent is extended or adjusted under 35 U.S.C. 154(b) by 485 days.

(21) Appl. No.: 15/513,244

(22) PCT Filed: Sep. 22, 2015

(86) PCT No.: PCT/EP2015/071688
§ 371 (c)(1),
(2) Date: Jul. 20, 2017

(87) PCT Pub. No.: WO2016/046185
PCT Pub. Date: Mar. 31, 2016

(65) Prior Publication Data
US 2017/0333976 A1 Nov. 23, 2017

(30) Foreign Application Priority Data

Sep. 22, 2014 (DE) ...................... 10 2014 113 663.2

(51) Int. Cl.
*B21J 15/14* (2006.01)
*B64F 5/10* (2017.01)
*B21J 15/42* (2006.01)

(52) U.S. Cl.
CPC .......... *B21J 15/142* (2013.01); *B21J 15/42* (2013.01); *B64F 5/10* (2017.01); *B23P 2700/01* (2013.01)

(58) Field of Classification Search
CPC ............ B21J 15/142; B21J 15/42; B64F 5/10
See application file for complete search history.

(56) References Cited

U.S. PATENT DOCUMENTS 3,154,979 A 11/1964 Crispin et al.
3,559,530 A 2/1971 Wagner et al.
(Continued)

FOREIGN PATENT DOCUMENTS

CN 101817146 9/2010
DE 19859679 6/2000
(Continued)

OTHER PUBLICATIONS

"German Search Report," for priority application No. DE102014113663.2 dated Sep. 2, 2015 (8 pages).
(Continued)

*Primary Examiner* — David P Bryant
*Assistant Examiner* — Nirvana Deonauth
(74) *Attorney, Agent, or Firm* — Pauly, DeVries Smith & Deffner LLC (57) ABSTRACT The disclosure relates to a processing installation for aircraft structural components having at least one processing station, wherein the processing station has a clamping frame which extends along a longitudinal station axis for receiving the aircraft structural component which is intended to be processed in each case and a processing unit, such as a riveting unit, for processing the aircraft structural component and wherein the clamping frame is articulated so as to be adjustable in terms of height and pivotable to two positioning towers which are arranged in a vertical tower plane. It is proposed that there be provided transversely relative to the tower plane a transverse offset of the clamping frame which enables an aircraft structural component to be loaded onto and/or unloaded from the clamping frame along the tower plane and at least one positioning tower to be passed laterally.

16 Claims, 4 Drawing Sheets

(56) References Cited

U.S. PATENT DOCUMENTS

| | | | |
|---|---|---|---|
| 3,858,731 A * | 1/1975 | Briggs | A01G 25/09 29/781 |
| 4,728,229 A | 3/1988 | Memmel et al. | |
| 4,753,555 A | 6/1988 | Yousko et al. | |
| 4,759,109 A | 7/1988 | Mason et al. | |
| 4,861,984 A | 8/1989 | West | |
| 4,966,323 A | 10/1990 | Weaver et al. | |
| 5,231,747 A | 8/1993 | Givler et al. | |
| 5,329,691 A | 7/1994 | Zienkiewicz et al. | |
| 5,339,152 A | 8/1994 | Horn et al. | |
| 5,404,633 A | 4/1995 | Givler et al. | |
| 5,699,599 A | 12/1997 | Zieve et al. | |
| 5,701,651 A | 12/1997 | Nelson et al. | |
| 5,778,505 A | 7/1998 | Reilly et al. | |
| 5,848,458 A | 12/1998 | Bullen | |
| 5,910,894 A | 6/1999 | Pryor | |
| 5,914,876 A | 6/1999 | Hirai | |
| 5,917,726 A | 6/1999 | Pryor | |
| 5,920,974 A | 7/1999 | Bullen et al. | |
| 6,001,181 A | 12/1999 | Bullen | |
| 6,223,413 B1 | 5/2001 | Crocker et al. | |
| 6,237,212 B1 | 5/2001 | Speller, Jr. et al. | |
| 6,254,317 B1 | 7/2001 | Chang | |
| 6,775,897 B2 | 8/2004 | Eisenhauer et al. | |
| 7,444,728 B2 | 11/2008 | Wesseloh | |
| 7,507,059 B2 | 3/2009 | Hamann | |
| 7,566,193 B2 | 7/2009 | Haj-Fraj et al. | |
| 7,682,112 B2 | 3/2010 | Panczuk et al. | |
| 8,220,134 B2 * | 7/2012 | Burns | B21J 15/14 227/51 |
| 8,302,321 B2 | 11/2012 | Hunter et al. | |
| 8,978,231 B2 | 3/2015 | Lemieux | |
| 9,157,735 B2 | 10/2015 | Haisty et al. | |
| 9,272,338 B2 | 3/2016 | Fujita et al. | |
| 9,868,549 B2 | 1/2018 | Goehlich et al. | |
| 2002/0113354 A1 | 8/2002 | Mangelsen et al. | |
| 2004/0090635 A1 | 5/2004 | Franz et al. | |
| 2004/0093731 A1 * | 5/2004 | Sarh | B21J 15/10 29/897.3 |
| 2006/0039765 A1 | 2/2006 | Hamann | |
| 2006/0230609 A1 | 10/2006 | Wang et al. | |
| 2007/0153296 A1 | 7/2007 | Schick | |
| 2007/0274797 A1 | 11/2007 | Panczuk et al. | |
| 2008/0254959 A1 | 10/2008 | Takayama et al. | |
| 2010/0011563 A1 | 1/2010 | Burns et al. | |
| 2013/0192050 A1 | 8/2013 | Lemieux | |
| 2013/0336737 A1 | 12/2013 | Fujita et al. | |
| 2014/0095107 A1 | 4/2014 | Haisty et al. | |
| 2014/0253913 A1 | 9/2014 | Bergman et al. | |
| 2017/0151643 A1 | 6/2017 | Ficken et al. | |
| 2018/0297107 A1 | 10/2018 | Meiners | |
| 2019/0001398 A1 | 1/2019 | Varrelmann | |

FOREIGN PATENT DOCUMENTS

| | | |
|---|---|---|
| DE | 102005023353 | 1/2006 |
| DE | 102008044262 | 6/2010 |
| DE | 202013003544 | 8/2014 |
| DE | 102013006506 | 10/2014 |
| DE | 102013110684 | 3/2015 |
| EP | 0566770 | 10/1993 |
| EP | 0600614 | 6/1994 |
| EP | 0956915 | 11/1999 |
| EP | 2090386 | 7/2010 |
| EP | 2792431 | 10/2014 |
| GB | 712624 | 7/1954 |
| WO | 9937429 | 7/1999 |
| WO | 2005065864 | 7/2005 |
| WO | 2015193464 | 12/2015 |
| WO | 2016046185 | 3/2016 |
| WO | 2016174133 | 11/2016 |

OTHER PUBLICATIONS

"International Preliminary Report on Patentability," for PCT/EP2015/071688 dated Apr. 6, 2017 (8 pages).
"International Search Report and Written Opinion," for corresponding PCT application No. PCT/EP2015/063777 dated Sep. 11, 2015 (10 pages).
"International Search Report and Written Opinion," for corresponding PCT application No. PCT/EP2015/071688 dated Dec. 2, 2015 (12 pages).
German Search Report for priority application No. DE102015106543.6 dated Sep. 16, 2015 (9 pages).
International Preliminary Report on Patentability for corresponding PCT application No. PCT/EP2015/063777 dated Dec. 20, 2016 (7 pages), English translation.
International Preliminary Report on Patentability for PCT Application No. PCT/EP2016/059480 dated Oct. 31, 2017 (6 pages), English translation.
International Search Report and Written Opinion for PCT Application No. PCT/EP2016/059480 dated Aug. 29, 2016 (20 pages) with English translation.
Communication Pursuant to Article 94(3) EPC for European Patent Application No. 1573104.3, dated Feb. 14, 2018 (6 pages).
German Search Report for priority application No. 20 2015 104 273.6, dated Jun. 3, 2016 (4 pages).
International Search Report and Written Opinion for corresponding PCT application No. PCT/EP2016/068855, dated Nov. 18, 2016 (10 pages).
Non-Final Office Action for U.S. Appl. No. 15/319,094 dated May 2, 2019 (39 pages).
Communication Pursuant to Article 94(3) EPC for European Patent Application No. 15731034.3 dated Jul. 26, 2018 (5 pages) No English Translation.
Final Office Action for U.S. Appl. No. 15/319,094 dated Oct. 3, 2019 (26 pages).
Response to Non-Final Rejection dated May 2, 2019 for U.S. Appl. No. 15/319,094, submitted via EFS-Web on Sep. 3, 2019, 10 pages.
Non-Final Office Action for U.S. Appl. No. 15/569,357 dated Jan. 22, 2020 (33 pages).
Ex Parte Quayle Action for U.S. Appl. No. 15/319,094 dated Nov. 23, 2020 (6 pages).
Non-Final Office Action for U.S. Appl. No. 15/752,371 dated Dec. 7, 2020 (28 pages).
Response to Non-Final Rejection dated Apr. 30, 2020 for Application U.S. Appl. No. 15/319,094, submitted via EFS-Web on Oct. 30, 2020, 13 pages.
Response to Non-Final Rejection dated May 11, 2020 for U.S. Appl. No. 15/752,371, submitted via EFS-Web on Sep. 11, 2020, 11 pages.
Final Office Action for U.S. Appl. No. 15/569,357 dated Aug. 7, 2020 (15 pages).
Non-Final Office Action for U.S. Appl. No. 15/319,094 dated Apr. 30, 2020 (22 pages).
Non-Final Office Action for U.S. Appl. No. 15/752,371 dated May 11, 2020 (41 pages).
Response to Final Rejection dated Oct. 3, 2019 for U.S. Appl. No. 15/319,094, submitted via EFS-Web on Mar. 3, 2020, 11 pages.
Response to Non-Final Rejection dated Jan. 22, 2020 for U.S. Appl. No. 15/569,357, submitted via EFS-Web on Jun. 22, 2020, 9 pages.
Notice of Allowance for U.S. Appl. No. 15/319,094 dated Feb. 12, 2021 (11 pages).
Response To Non-Final Rejection (Ex Parte Quayle), dated Nov. 23, 2020 for U.S. Appl. No. 15/319,094, Submitted Via EFS-Web on Jan. 20, 2021, 7 Pages.

* cited by examiner

PROCESSING SYSTEM FOR AIRCRAFT STRUCTURAL COMPONENTS

CROSS-REFERENCE TO RELATED APPLICATIONS

This application is a national stage application under 35 U.S.C. 371 of International Patent Application Serial No. PCT/EP2015/071688, entitled "PROCESSING SYSTEM FOR AIRCRAFT STRUCTURAL COMPONENTS," filed Sep. 22, 2015, which claims priority from German Patent Application No. DE 10 2014 113 663.2, filed Sep. 22, 2014 the disclosure of which is incorporated herein by reference.

FIELD OF THE TECHNOLOGY

The disclosure relates to a processing system or installation for aircraft structural components and a method for operating such a processing system or installation.

BACKGROUND

The production of flying objects and in particular aircraft involves processing large aircraft structural components such as, for example, the wing and the fuselage or portions thereof in special processing installations.

The known processing installation (DE 20 2013 003 544 U1), on which the disclosure is based, has a processing station with a clamping frame for receiving the aircraft structural component which is intended to be processed in each case. The processing station is further provided with a processing unit which is constructed as a riveting unit.

For the processing of the aircraft structural components, an orientation between the clamping frame and the processing unit is required. With regard to the often freeform-like surface geometries of the aircraft structural components, the orientation is based on an at least two-axis pivoting adjustment. In the known processing installation, the clamping frame can be pivoted by means of end-side pivot bearings about a longitudinal frame axis. Furthermore, the pivot bearings are articulated so as to be able to be adjusted in terms of height to positioning towers which are arranged in a vertical door plane, whereby the pivotability of the clamping frame can be produced about substantially any notional transverse frame axes.

It is advantageous with the known processing installation that, in view of the above pivotability of the clamping frame, a pivotability of the rivet unit which regularly has an upper tool and a lower tool is not required. This simplifies the mechanical structure of the processing unit.

A challenge with the known processing installation is, however, the loading and unloading of an aircraft structural component onto or from the clamping frame. The reason for this is the necessity of the positioning towers in order to enable the pivotability about a notional transverse frame axis. In the known processing installation, loading and unloading is possible only transversely relative to the longitudinal station axis without a collision occurring with the positioning towers. As a result, linear production in which the aircraft structural component is transported cyclically along a longitudinal station axis from processing station to processing station is possible only with great handling complexity.

SUMMARY

The problem addressed by the disclosure is to configure and develop the known processing installation or system in such a manner that the loading and/or the unloading of an aircraft structural component onto or from the clamping frame is simplified.

The above problem is solved with a processing installation, which may also be referred to as a processing system, as described herein.

A significant aspect is the basic consideration of articulating the clamping frame to the positioning towers in such a manner that the loading or unloading of the clamping frame is impeded to a lesser extent by the positioning towers. In detail, it is proposed that there be provided transversely relative to the tower plane a transverse offset of the clamping frame which enables an aircraft structural component to be loaded onto and/or unloaded from the clamping frame along the tower plane and at least one positioning tower to be passed laterally. Consequently, the processing station can be integrated in a production line in such a manner that the longitudinal frame axis of the clamping frame is orientated with respect to the material flow direction of the production line. The loading and/or unloading of the clamping frame can then be carried out without intermediate handling operations in the material flow direction of the production line, which can correspond to the longitudinal station axis.

The solution as proposed can be used with quite different processing units. In some embodiments, the processing unit is provided with an upper tool and a lower tool which are arranged in a variant on a portal-like frame. In this instance, the aircraft structural component protrudes, depending on the position of the portal-like frame along the longitudinal station axis, through the portal-like frame. For the loading or unloading the processing unit is intended to be moved into a corresponding parking position in order to prevent collisions with the aircraft structural component. Furthermore, the embodiment with the portal-like frame is a comparatively cost-effective variant.

Even more cost-effective is the further embodiment in which the upper tool and lower tool are arranged on a frame, which in particular is constructed in a C-shaped manner. Such a C-shaped frame can with an appropriate configuration be completely moved out of the movement region of the aircraft structural component transversely relative to the longitudinal station axis as necessary for loading and/or unloading. This adjustability of the frame transversely relative to the longitudinal station axis is further advantageous since an adjustability of the upper tool and lower tool relative to the frame is not required which further reduces the structural and technical control complexity compared with a portal system mentioned above.

A particularly simple implementation of the transverse offset as proposed is disclosed. The carrier frames may be simple steel profiles which protrude transversely from the positioning towers.

Further embodiments relate to advantageous variants for the production of transfer stations which may in particular be constructed as set-up locations. The provision of the transfer stations with roller arrangements enables particularly simple transport of the respective aircraft structural component.

A particularly compact and at the same time mechanically particularly robust embodiment is produced with there being associated with the two positioning towers two processing stations which are arranged at two opposing sides with respect to the tower plane. With the symmetrical configuration, there is afforded in a particularly robust manner the possibility of using the processing installation within two production lines running parallel.

According to another teaching, a method for operating a processing installation as proposed is disclosed.

It is significant according to the additional teaching that loading and/or unloading is carried out by means of a transport, in particular a displacement, of the aircraft structural component between at least one transfer station and at least one processing station. A significant aspect is the basic consideration that the loading and/or unloading is carried out along the tower plane via at least one transfer station. In this instance, there may also in principle be provision for the transfer station which is arranged upstream of the processing station as proposed to act at the same time as a transfer station which is arranged downstream of an additional processing station. In this regard, the method as proposed is intended for use in a production line with a plurality of processing stations which are arranged in the material flow direction of the production line.

Various embodiments provide a processing installation for aircraft structural components having at least one processing station, wherein the processing station has a clamping frame which extends along a longitudinal station axis for receiving the aircraft structural component which is intended to be processed in each case and a processing unit, such as a riveting unit, for processing the aircraft structural component and wherein the clamping frame is articulated so as to be adjustable in terms of height and pivotable to two positioning towers which are arranged in a vertical tower plane, wherein there is provided transversely relative to the tower plane a transverse offset of the clamping frame which enables an aircraft structural component to be loaded onto and/or unloaded from the clamping frame along the tower plane and at least one positioning tower to be passed laterally.

In various embodiments, the processing unit has an upper tool and a lower tool and in that the upper tool and the lower tool are arranged on a portal-like frame which can be displaced in a motorised manner parallel with the longitudinal station axis, such as the upper tool and lower tool are arranged transversely relative to the longitudinal station axis in each case, in particular independently of each other, so as to be able to be displaced on the frame.

In various embodiments, the processing unit has an upper tool and a lower tool and in that the upper tool and the lower tool are arranged on a frame, such as a C-shaped frame which can be displaced transversely relative to the longitudinal station axis and parallel with the longitudinal station axis, such as the upper tool and lower tool are securely arranged in each case on the frame transversely relative to the longitudinal station axis.

In various embodiments, that the frame can be displaced transversely relative to the longitudinal station axis in such a manner that an aircraft structural component can be loaded onto and/or unloaded from the clamping frame parallel with the longitudinal station axis and is free from the frame laterally past at least one positioning tower.

In various embodiments, the clamping frame at least in a basic position of the clamping frame is orientated with the longitudinal frame axis thereof parallel with the longitudinal station axis.

In various embodiments, there is provided for the aircraft structural component a component carrier which is releasably fixed to the clamping frame.

In various embodiments, the clamping frame defines a carrier region over which the clamped aircraft structural component passes and in that the carrier region is arranged at the side of the positioning towers.

In various embodiments, there are associated with the clamping frame for the articulation thereof two articulation bearings which are arranged offset relative to each other along the longitudinal station axis and in that the articulation bearings are in each case arranged offset transversely relative to the longitudinal station axis.

In various embodiments, the clamping frame is coupled to the positioning towers by means of carrier arms which can extend transversely relative to the tower plane.

In various embodiments, the clamping frame can be adjusted in terms of height with respect to the positioning towers in a motorised manner by means of the carrier arms, and/or in that the clamping frame can be pivoted in a motorised manner with respect to the positioning towers by means of the articulation bearings.

In various embodiments, for the loading and/or unloading there is provided at least one transfer station which is arranged with respect to the longitudinal station axis on an end portion of the processing installation, such as there are provided two transfer stations which are arranged with respect to the longitudinal station axis on two end portions of the processing installation.

In various embodiments, the transfer station and/or the clamping frame has/have a longitudinal bearing arrangement for longitudinally displaceable support of the aircraft structural component so that the aircraft structural component can be displaced between the transfer station and the clamping frame, such as the longitudinal bearing arrangement has a roller arrangement.

In various embodiments, two processing stations each having a clamping frame are provided and in that the clamping frames are each articulated to the two positioning towers.

In various embodiments, the two clamping frames are arranged at two opposing sides with respect to the tower plane.

In various embodiments, the two processing stations with respect to the tower plane are constructed symmetrically with respect to each other, and/or in that the longitudinal frame axes of the two clamping frames at least in a basic position of the clamping frames are orientated parallel with each other.

In various embodiments, the transfer station or the transfer stations can be displaced transversely relative to the longitudinal station axis and can consequently be orientated in a motorised manner on the longitudinal frame axes of the two clamping frames.

In various embodiments, the loading and/or the unloading is carried out by means of a transport, in particular a displacement, of the aircraft structural component between at least one transfer station and at least one processing station along the tower plane.

In various embodiments, the aircraft structural component is first transported from a transfer station to the clamping frame of the processing station, is subsequently processed by means of the processing unit at that location and is finally transported to the or an additional transfer station, such as the transfer station, the processing unit and the additional transfer station are arranged one behind the other along the longitudinal station axis.

In various embodiments, the aircraft structural component is processed successively on a first processing station and subsequently on a second processing station.

BRIEF DESCRIPTION OF THE FIGURES

Various embodiments are explained in greater detail below with reference to drawings which purely illustrate embodiments. In the drawings.

DETAILED DESCRIPTION

The processing installation or system 1 illustrated serves to process aircraft structural components 2 which may be, as mentioned above, fuselages, wings or other large aircraft structural components. The processing installation 1 has at least one processing station 3, 4 in this instance two processing stations 3, 4. In order to explain the processing stations 3, 4 in the context of a clear illustration, reference is made below primarily to the processing station 3 which is illustrated on the right in FIG. 1. These explanations accordingly apply to the additional processing station 4.

The processing station 3, 4 has a clamping frame 7, 8 which extends along a longitudinal station axis 5, 6 for receiving the aircraft structural component 2 which is intended to be processed in each case. The extent of the clamping frame 7, 8 along the longitudinal station axis 5, 6 is intended to be understood in a broad sense, it means that the clamping frame 7, 8 extends at least in a basic position parallel with the longitudinal station axis 5, 6.

The processing station 3, 4 is further provided with a processing unit 9, 10 for processing the aircraft structural component 2. The processing unit 9, 10 is in this instance a riveting unit.

Figure 1:
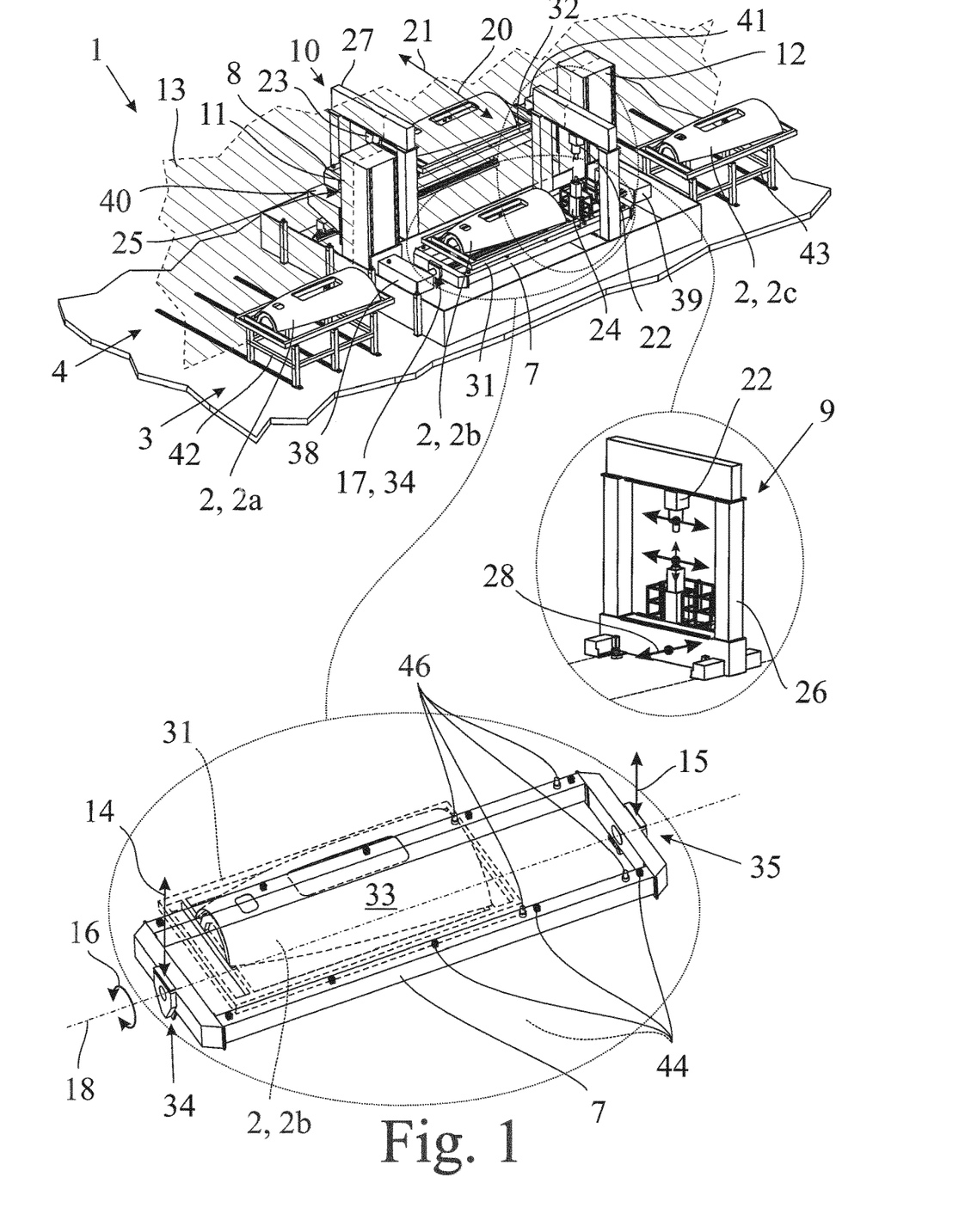
FIG. 1 is a perspective view of a processing installation as proposed.

The clamping frame 7, 8 is articulated so as to be able to be adjusted in terms of height and pivoted to two positioning towers 11, 12 which are arranged in a vertical tower plane 13. The height adjustability is designated 14, 15 in FIG. 1, whilst the pivotability is designated 16. In FIG. 1, it is clear that the height adjustability 14, 15 is possible separately for both positioning towers 11, 12 so that a pivoting of the clamping frame 7, 8 about a notional pivot axis which extends transversely to the longitudinal station axis 5, 6 is possible. To this end, there is provided for the clamping frame 7, 8 a longitudinal compensation 17 which ensures that in the event of a different height adjustment at both positioning towers 11, 12 there is no mechanical tension produced between the positioning towers 11, 12 and the clamping frame 7, 8.

The pivotability of the clamping frame 7, 8 defines a longitudinal frame axis 18, 19 which provides a corresponding pivot axis. The clamping frame 7, 8 is constructed so as to be elongate along the longitudinal frame axis 18, 19.

It is now advantageous that a transverse offset 20, 21 of the clamping frame 7, 8 with respect to the tower plane 13 is provided, which offset enables an aircraft structural component 2 to be loaded onto and/or unloaded from the clamping frame 7, 8 along the tower plane 13 and at least one positioning tower 11, 12 to be passed laterally.

The transition from FIG. 2a to FIG. 2b shows the loading of the clamping frame 7, 8 with the aircraft structural component 2. In this instance, it can be seen that the aircraft structural component 2 is moved past the positioning tower 11. The transition from FIG. 2b to FIG. 2c shows the unloading of the clamping frame 7, 8 in which the aircraft structural component 2 is moved past the other positioning tower 12. In this case, it is advantageous that, although the often high positioning towers 11, 12 in principle produce a collision risk for the aircraft structural component 2 during the loading or unloading operation. As a result of the transverse offset 20, 21 of the clamping frame 7, 8 as proposed, the positioning towers 11, 12 are located outside the movement region of the aircraft structural component 2.

Different advantageous variants are conceivable for the construction of the processing unit 9, 10. In the illustrated embodiment, the processing unit 9, 10 has an upper tool 22, 23 and a lower tool 24, 25, wherein the upper tool 22, 23 and the lower tool 24, 25 are arranged on a frame 26, 27 which is portal-like in FIG. 1. The frame 26, 27 can be adjusted in a motorised manner parallel with the longitudinal station axis 5, 6. The adjustability of the frame 26, 27 is designated 28 in FIG. 1. In addition, the upper tool 22, 23 and lower tool 24, 25 are each arranged on the frame 26, 27 so as to be able to be adjusted transversely relative to the longitudinal station axis 5, 6. The upper tool 22, 23 can be adjusted independently of the lower tool 24, 25 so that a corresponding synchronisation in terms of technical control between the adjustment of the upper tool 22, 23 and the adjustment of the lower tool 24, 25 is required.

Figure 4:
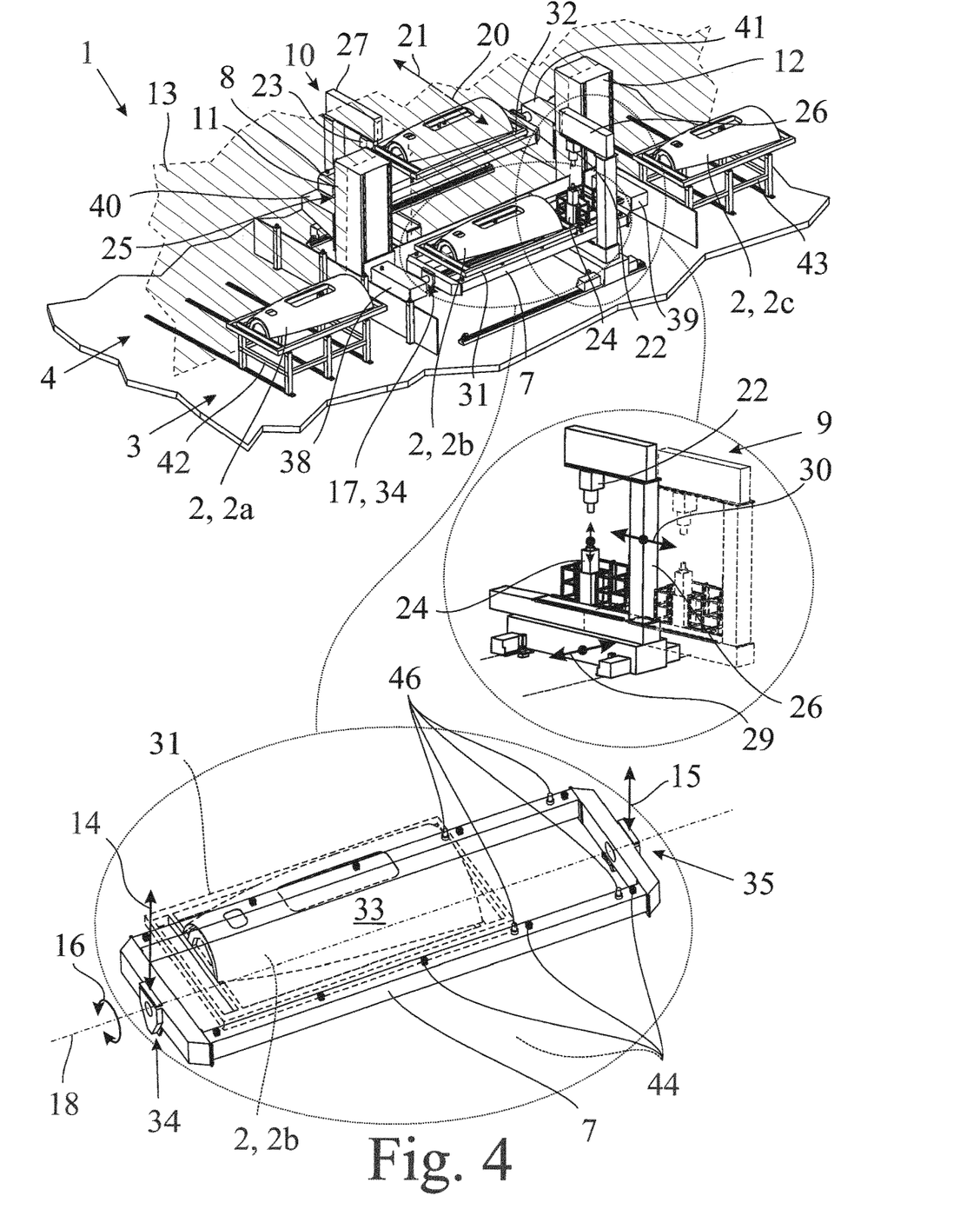
FIG. 4 is a perspective view of another embodiment of a processing installation as proposed in accordance with the illustration according to FIG. 1.

An alternative embodiment for the processing unit 9, 10 is shown in FIG. 4. In this instance, the frame 26, 27 can be adjusted transversely relative to the longitudinal station axis 5, 6 and parallel with the longitudinal station axis 5, 6. These two adjustment possibilities are designated 29, 30 in FIG. 4. Furthermore, in this instance the frame 26, 27 is constructed in a C-shaped manner so that the processing unit 9, 10 can be moved in a simple manner out of the movement region of the aircraft structural component 2. In this instance, the upper tool 22, 23 and the lower tool 24, 25 are securely arranged transversely relative to the longitudinal station axis 5, 6 in each case on the frame 26, 27. With the exception of the construction of the processing unit 9, 10, the structure of the processing installation 1 illustrated in FIG. 4 corresponds to the structure of the processing installation 1 illustrated in FIG. 1. In this regard, in order to explain the processing installation 1 illustrated in FIG. 4, reference may be made to the statements relating to the processing installation 1 illustrated in FIG. 1.

As indicated above, the frame 26, 27 illustrated in FIG. 4 can be adjusted transversely relative to the longitudinal station axis 5, 6 in such a manner that the loading or unloading of an aircraft structural component 2 onto or from the clamping frame 7, 8 parallel with the longitudinal station axis 5, 6 and laterally past at least one positioning tower 11, 12 is free from the frame 26, 27. A position of the frame 26, 27 adjusted in this manner is illustrated in FIG. 4 with broken lines. In this instance, it is possible to see in particular the advantage of a C-shaped frame 26, 27 whose construction which is open at one side first enables the operating method described above.

In this instance, the longitudinal station axis 5, 6 is constructed parallel with the tower plane 13. Furthermore, it is the case here for the clamping frame 7, 8 at least in the basic position illustrated in FIG. 1 to be orientated with the longitudinal frame axis 18, 19 parallel with the longitudinal station axis 5, 6. Other possibilities for orientation are conceivable depending on the respective application.

In principle, the aircraft structural component 2 may be fixed directly to the clamping frame 7, 8, in particular clamped. For the purposes of a simple definition of tool reference points, however, it is possible for there to be provided for the aircraft structural component 2 a component carrier 31, 32 which can be releasably fixed to the clamping frame 7, 8. Such a component carrier 31, 32 further provides the mechanical stability required for the transport of the aircraft structural component 2.

The lower detailed illustration in FIG. 1 shows that the clamping frame 7, 8 defines a carrier region 33 over which the clamped aircraft structural component 2 passes, wherein the carrier region 33 is arranged at the side of the positioning towers 11, 12. As a result of the lateral arrangement of the carrier region 33, the collision-free loading and unloading as proposed of an aircraft structural component 2 onto or from the clamping frame 7, 8 are ensured.

For the articulation thereof, there are associated with the clamping frame 7, 8 two articulation bearings 34, 35; 36, 37 which are arranged offset with respect to each other along the longitudinal station axis 5, 6 and which are each arranged offset transversely relative to the tower plane 13. In view of the fact that the height adjustability of the clamping frame 7, 8 at the positioning towers 11, 12 can be carried out separately, it is appropriate that the articulation bearings 34, 35; 36, 37 are constructed as cardan bearings. Other possibilities for the construction of the articulation bearings 34, 35; 36, 37 are conceivable.

A particularly simple implementation of the transverse offset as proposed of the clamping frame 7, 8 transversely relative to the tower plane 13 is shown in FIG. 1. In this instance, the clamping frame 7, 8 is coupled to the positioning towers 11, 12 by means of carrier arms 38, 39; 40, 41 which in this instance extend transversely relative to the tower plane 13. The carrier arms 38, 39; 40, 41 are in the illustrated embodiment constructed in a box-like manner. However, it is also conceivable for the carrier arms 38, 39; 40, 41 to be constructed as simple steel profiles.

In order to achieve automated production, the clamping frame 7, 8 can be adjusted in terms of height in a motorised manner with respect to the positioning towers 11, 12 by means of the carrier arms 38, 39; 40, 41. Alternatively or additionally, it is the case that the clamping frame 7, 8 can be pivoted in a motorised manner with respect to the positioning towers 11, 12 by means of the articulation bearings 34, 35; 36, 37. For the height adjustability, a drive can be associated with the two positioning towers 11, 12, respectively. For the pivotability of the clamping frame 7, 8 about the longitudinal frame axis 18, 19, in some embodiments only a single drive which is arranged at the end side of the clamping frame is associated with the clamping frame 7, 8.

FIG. 1 further shows that there is provided for the loading and/or the unloading at least one transfer station 42, 43 which is arranged with respect to the longitudinal station axis 5, 6 on an end portion of the processing installation 1. In this instance, there are provided a total of two transfer stations 42, 43 which are arranged accordingly at opposing end portions of the processing installation 1.

It is advantageous in the embodiments illustrated in FIGS. 1 and 4 that a transfer station 42 is arranged with respect to the material flow direction upstream of the processing unit 9, 10, whilst the transfer station 43 with respect to the material flow direction is arranged downstream of the processing unit 9, 10. The processing unit 42 may in particular be used as a set-up location for the processing unit 9, 10.

In principle, the transfer stations 42, 43 may be constructed as simple tables on which the aircraft structural component 2 can be deposited together with the component carrier 31, 32. The transport from the transfer station 42 to the clamping frame 7, 8 can then be carried out by means of transport devices, such as a crane or the like. However, the transport is particularly simple if, as illustrated, the transfer station 42, 43 and the clamping frame 7, 8 has or have a longitudinal bearing arrangement 44, 45 for longitudinally displaceable support of the aircraft structural component 2, and where applicable the component carrier 31, 32 which is connected thereto, so that the aircraft structural component 2 can be displaced between the transfer station 42, 43 and the clamping frame 7, 8. In the illustrated embodiment, the longitudinal bearing arrangements 44, 45 each have a roller arrangement. Depending on the aircraft structural component 2 which is intended to be transported, it is then possible for the transport of the aircraft structural component 2 from the transfer station 42 to the clamping frame 7, 8 to be carried out manually. However, it is also conceivable for the roller arrangements to be driven in a motorised manner so that the transport is also carried out in an automated manner. In both cases, there can be provision for an end stop arrangement 46, 47 to limit the longitudinal displaceability of the aircraft structural component 2. The end stop arrangement 46, 47 can further be controlled by means of corresponding actuators so that after the processing operation the further transport of the aircraft structural component 2 is possible.

In various embodiments, the height of the transfer stations 42, 43 is substantially identical to the height of the clamping frame 7, 8 as long as the clamping frame 7, 8 is located in a predetermined transfer position. Consequently, the loading of the clamping frame 7, 8 with the aircraft structural component 2 can be carried out without a complex height offset of the aircraft structural component 2 being required. For good longitudinal guiding, in this instance an additional supporting roller arrangement is provided between the transfer station 42 and the clamping frame 7, 8.

Figure 2:
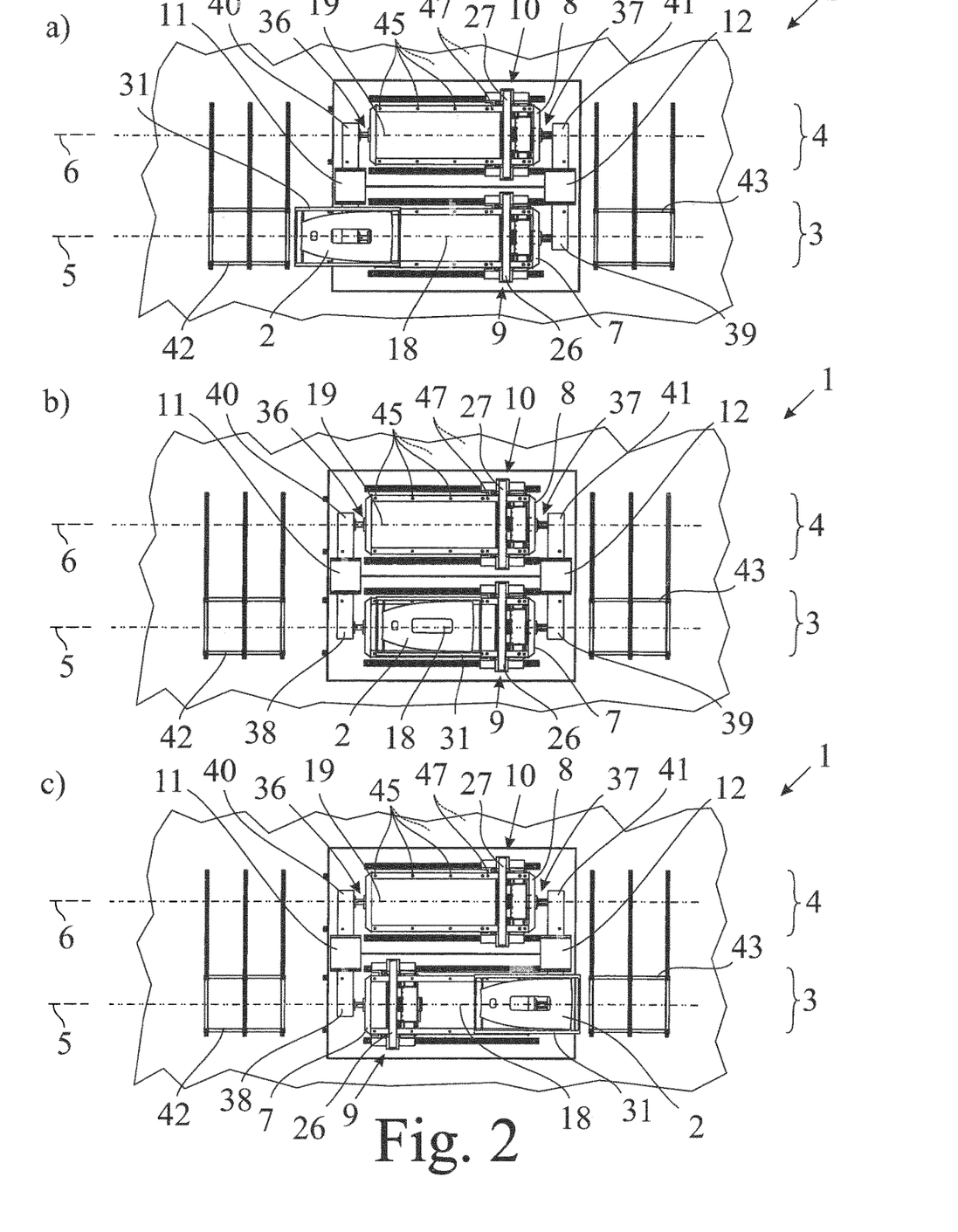
FIG. 2 shows the processing installation according to FIG. 1 a) during the loading operation, b) during the processing operation, c) during the unloading operation.

FIG. 2a shows the situation during the loading of the clamping frame 7 with the aircraft structural component 2. The aircraft structural component 2 is located in this instance half-way to the clamping frame 7. The processing unit 9 is located in FIG. 2 at the right-hand side in order not to impede the loading.

FIG. 2b shows the clamping frame 7 in the loaded state. From this state, the aircraft structural component 2 is processed by the processing unit 9, in this instance riveted.

FIG. 2c finally shows the unloading operation, in which the aircraft structural component 2 is transported from the clamping frame 7 to the transfer station 43. The processing unit 9 is located in this instance in the left-hand position in FIG. 4 in which it does not impede the unloading.

It can best be seen from an overview of FIGS. 1 and 2 that the processing installation 1 in this instance has not only a single processing station 3, but instead two processing stations 3, 4 each having a clamping frame 7, 8, wherein the clamping frames 7, 8 in this instance are each articulated to the two positioning towers 11, 12. The positioning towers 11, 12 are thus used twice, that is to say, on the one hand, for the articulation of the clamping frame 7 and, on the other hand, for the articulation of the clamping frame 8. This leads to a generally compact and cost-effective arrangement.

In the illustrated embodiment, it is the case that the two clamping frames 7, 8 are arranged at two opposing sides with respect to the tower plane 13. It is thereby possible for the positioning towers 11, 12 at both sides of the tower plane 13 to be loaded in a similar manner, at least as a result of the gravitational force, which generally provides the stability of the arrangement.

A mechanically quite particularly stable arrangement is produced by the two processing stations 3, 4 being constructed symmetrically with respect to each other relative to the tower plane 13. Alternatively or additionally, the longitudinal frame axes 18, 19 of the two clamping frames 7, 8 at least in the illustrated basic position are orientated parallel with each other. This leads to a further increase of the symmetry of the arrangement, which in turn is linked with an increase of the mechanical stability.

It is advantageous in the illustrated embodiments that the transfer station 42, 43 or the transfer stations 42, 43 can be displaced transversely relative to the longitudinal station axis 5, 6 and consequently can be orientated on the longitudinal frame axes 18, 19 of the two clamping frames 7, 8. This displaceability of the transfer station 42, 43 or the transfer stations 42, 43 can be provided manually or in some embodiments in a motorised manner. For this transverse displaceability there is associated in each case with the transfer stations 42, 43 a transverse bearing arrangement 49, 50 which in the illustrated embodiment has a total of three linear bearings, which are indicated in each case in the drawing as a solid line.

According to an additional teaching, a method for operating a processing installation 1 as proposed is disclosed.

It is significant according to the additional teaching for the loading and/or the unloading of the clamping frame 7, 8 by a transport, in this instance a displacement, of the aircraft structural component between at least one transfer station 42, 43 and at least one processing station 3, 4 to be carried out along the tower plane 13. This has already been explained above.

Figure 3:
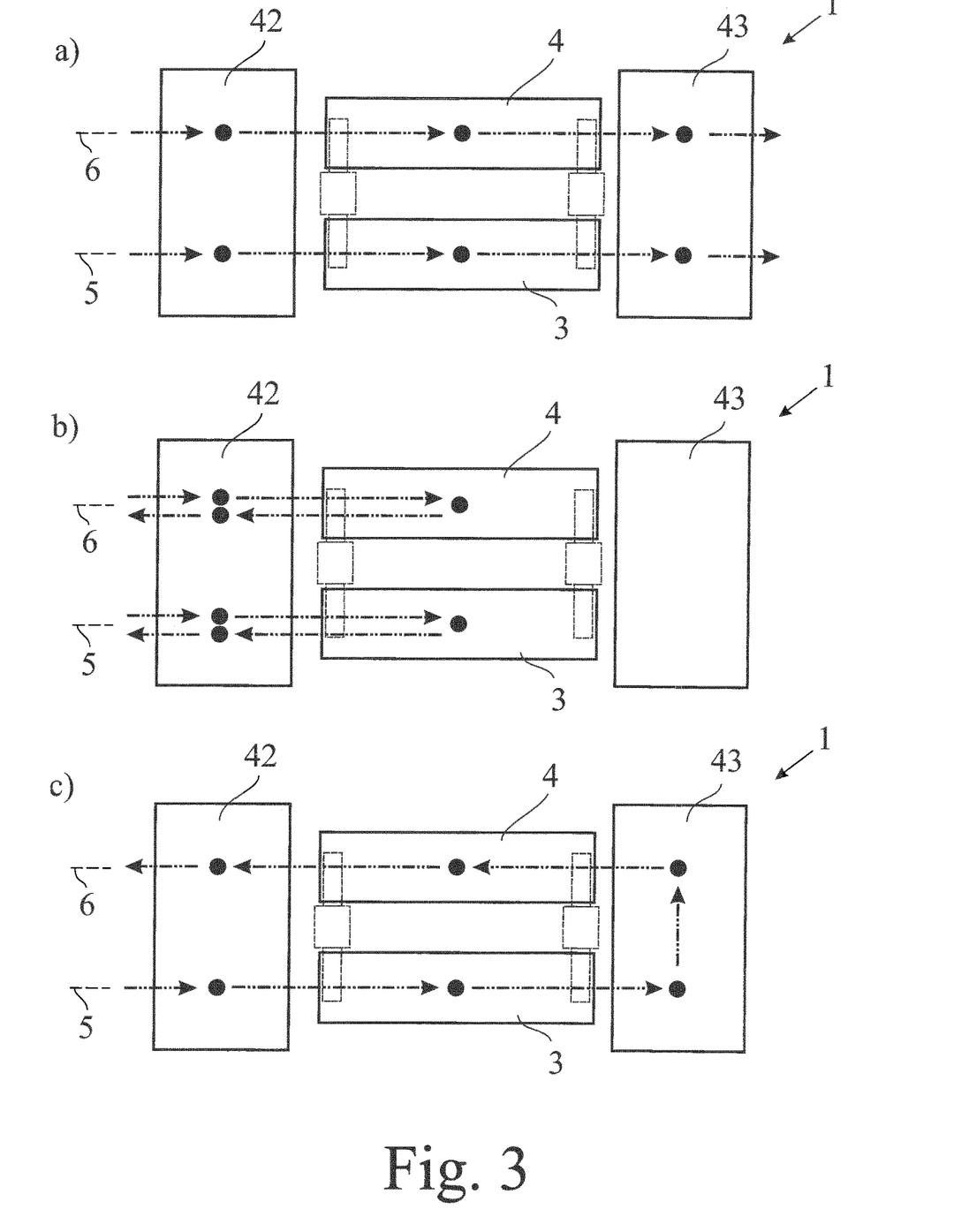
FIG. 3 is a schematic illustration of the processing installation according to FIG. 1 a) in a first material flow variant, b) in a second material flow variant and c) in a third material flow variant.

FIG. 3 shows different embodiments of the method as proposed. In the illustration according to FIG. 3a, it is the case that the aircraft structural component 2 is first transported from a transfer station 42, 43 to the clamping frame 7, 8 of the processing station 3, 4. Subsequently, the aircraft structural component 2 is processed by means of the processing unit 9, 10 at that location. Finally, the aircraft structural component 2 is transported to another transfer station 43. This is the conventional case of a production line.

However, there may alternatively also be provision for the aircraft structural component 2 to be transported back to the same transfer station 42 after the processing operation. This is shown by way of example in FIG. 3b.

FIG. 3c shows another embodiment of the method as proposed in which the aircraft structural component 2 is processed successively on a first processing station 3 and subsequently on a second processing station 4. Between the two processing steps, the aircraft structural component 2 is deposited on the transfer station 43 and subsequently supplied to the processing unit 10 of the processing station 4.

In an embodiment which can be for linear production, there is provision for the transfer station 42, the processing unit 9, 10 and the additional transfer station 43 to be arranged one behind the other along the longitudinal station axis 5, 6.

As a result, the processing installation 1 as proposed affords numerous perspectives in particular for linear production. However, the illustration according to FIG. 3b shows in particular that the processing installation 1 as proposed can also advantageously be used as a standalone processing installation.

The invention claimed is:

1. A processing installation for an aircraft structural component comprising at least one processing station, wherein the processing station comprises a clamping frame which extends along a longitudinal station axis for receiving the aircraft structural component which is intended to be processed, and a processing unit for processing the aircraft structural component, the processing unit having a frame extending transverse to the longitudinal station axis of the clamping frame, the processing unit comprising an upper tool and a lower too arranged on the frame and configured to be displaced in a motorized manner parallel with the longitudinal station axis; wherein the clamping frame is articulated so as to be adjustable in terms of height and pivotable to two positioning towers which are arranged in a vertical tower plane, wherein the tower plane is defined as a plane including the two positioning towers, and located parallel and transversely offset to the longitudinal station axis of the clamping frame; wherein there is provided transversely relative to the tower plane a transverse offset of the clamping frame which enables an aircraft structural component to be loaded onto and/or unloaded from the clamping frame along the tower plane and at least one positioning tower to be passed laterally, and wherein the clamping frame is coupled to the positioning towers by carrier arms which extend transversely relative to the tower plane.

2. The processing installation according to claim 1, wherein the frame of the processing unit includes a C-shaped frame where the upper tool and lower tool are arranged, the C-shaped frame is configured to be displaced transversely relative to the longitudinal station axis and parallel with the longitudinal station axis.

3. The processing installation according to claim 2, wherein the clamping frame is configured to be displaced transversely relative to the longitudinal station axis in such a manner that an aircraft structural component can be loaded onto and/or unloaded from the clamping frame parallel with the longitudinal station axis.

4. The processing installation according to claim 1, wherein the clamping frame, at least in a basic position of the clamping frame, is orientated with a longitudinal frame axis thereof parallel with the longitudinal station axis.

5. The processing installation according to claim 1, further comprising a component carrier for the aircraft structural component, wherein the component carrier is releasably fixed to the clamping frame.

6. The processing installation according to claim 1, wherein the clamping frame defines a carrier region arranged at a side of the positioning towers.

7. The processing installation according to claim 1, wherein the clamping frame is adjustable in terms of height with respect to the positioning towers in a motorized manner by the carrier arms, and/or wherein the clamping frame is configured to be pivoted in a motorized manner with respect to the positioning towers by one or more articulation bearings.

8. The processing installation according to claim 1, further comprising at least one transfer station for the loading and/or unloading, wherein the transfer station is arranged with respect to the longitudinal station axis on an end portion of the processing installation.

9. The processing installation according to claim 8, wherein the transfer station and/or the clamping frame has/have a longitudinal bearing arrangement for longitudinally displaceable support of the aircraft structural component so that the aircraft structural component is configured to be displaced between the transfer station and the clamping frame.

10. The processing installation according to claim 1, further comprising two processing stations, each of the two processing stations comprising a clamping frame having a longitudinal station axis, wherein the clamping frames are each articulated to the two positioning towers.

11. The processing installation according to claim 10, wherein the two clamping frames are arranged at two opposing sides with respect to the tower plane.

12. The processing installation according to claim 10, wherein the clamping frame of each of the two processing stations comprises a longitudinal frame axis, wherein the two processing stations with respect to the tower plane are constructed symmetrically with respect to each other, and/or wherein the longitudinal frame axes of the two clamping frames, at least in a position of the clamping frames, are orientated parallel with each other.

13. The processing installation according to claim 12, further comprising at least one transfer station for the loading and/or unloading, wherein the at least one transfer station is configured to be displaced transversely relative to the longitudinal station axes and can consequently be orientated in a motorized manner on the longitudinal frame axes of the two clamping frames.

14. A method for operating a processing installation for an aircraft structural component provided a processing installation comprising at least one processing station, wherein the processing station comprises a clamping frame which extends along a longitudinal station axis for receiving the aircraft structural component which is intended to be processed, and a processing unit for processing the aircraft structural component, the processing unit having a frame extending transverse to the longitudinal station axis of the clamping frame, the processing unit comprising an upper tool and a lower tool arranged on the frame and configured to be displaced in a motorized manner parallel with the longitudinal station axis; wherein the clamping frame is articulated so as to be adjustable in terms of height and pivotable to two positioning towers which are arranged in a vertical tower plane, wherein the tower plane is defined as a plane including the two positioning towers, and located parallel and transversely offset to the longitudinal station axis of the clamping frame, wherein there is provided transversely relative to the tower plane a transverse offset of the clamping frame which enables an aircraft structural component to be loaded onto and/or unloaded from the clamping frame along the tower plane and at least one positioning tower to be passed laterally, and wherein the clamping frame is coupled to the positioning towers by carrier arms which extend transversely relative to the tower plane; loading and/or unloading the aircraft structural component by transporting the aircraft structural component between at least one transfer station and at least one processing station along the tower plane.

15. The method according to claim 14, further comprising, in order, transporting the aircraft structural component from a transfer station to the clamping frame located at the processing station, processing the aircraft structural component with the processing unit located at the processing station, and transporting the aircraft structural component to the transfer station or to an additional transfer station.

16. The method according to claim 14, further comprising processing the aircraft structural component on a first processing station and subsequently on a second processing station.

* * * * *